(12) United States Patent
Sasano et al.

(10) Patent No.: US 8,241,385 B2
(45) Date of Patent: Aug. 14, 2012

(54) AIR CLEANER UNIT FOR INTERNAL COMBUSTION ENGINE

(75) Inventors: Norihisa Sasano, Yatomi (JP); Akihiro Maeda, Kariya (JP); Akira Nakawatase, Toyota (JP); Ryuji Kanzaka, Nishikamo-gun (JP); Yuji Matsubara, Toyota (JP); Shingo Kimura, Ikeda (JP); Akira Enomoto, Kariya (JP); Kazuya Tanaka, Kariya (JP)

(73) Assignees: Denso Corporation, Kariya (JP); Toyota Jidosha Kabushiki Kaisha, Toyota (JP); Toyota Boshoku Kabushiki Kaisha, Kariya (JP)

( * ) Notice: Subject to any disclaimer, the term of this patent is extended or adjusted under 35 U.S.C. 154(b) by 562 days.

(21) Appl. No.: 12/079,627

(22) Filed: Mar. 27, 2008

(65) Prior Publication Data

US 2008/0314357 A1 Dec. 25, 2008

(30) Foreign Application Priority Data

Mar. 30, 2007 (JP) ................................ 2007-093729

(51) Int. Cl.
*B01D 46/00* (2006.01)
*F02M 35/024* (2006.01)

(52) U.S. Cl. ............. 55/503; 55/385.3; 55/493; 55/497; 55/502; 123/198 E (58) Field of Classification Search ..................... 55/493, 55/502, 503, DIG. 28, 385.3, 497; 123/198 E
See application file for complete search history.

(56) References Cited

U.S. PATENT DOCUMENTS

| 3,620,376 | A | * | 11/1971 | Gingher | 211/123 |
| 5,295,602 | A | * | 3/1994 | Swanson | 220/786 |
| 5,569,311 | A | | 10/1996 | Oda et al. | |
| 5,730,768 | A | * | 3/1998 | Kaminaga et al. | 55/385.3 |
| 6,174,343 | B1 | * | 1/2001 | Bloomer | 55/385.3 |
| 6,293,984 | B1 | * | 9/2001 | Oda et al. | 55/497 |
| 7,473,292 | B2 | * | 1/2009 | Moriyama et al. | 55/502 |

(Continued)

FOREIGN PATENT DOCUMENTS

EP 0 823 548 2/1998

(Continued)

OTHER PUBLICATIONS

Office Action dated Jan. 13, 2009 in Japanese Application No. 2007-093729.

(Continued)

*Primary Examiner* — Robert Clemente
(74) *Attorney, Agent, or Firm* — Harness, Dickey & Pierce, PLC (57) ABSTRACT

An air cleaner unit includes a casing and a filter element disposed in the casing for filtering air to be introduced into an internal combustion engine of a vehicle. The casing includes a first case member and a second case member that are coupled to each other such that the filter element is housed in an element housing portion of the casing. The first case member has a hinge receiving portion, and the second case member has a hinge inserting portion. The hinge receiving portion and the hinge inserting portion are disposed under the element housing portion. The hinge receiving portion includes an engagement opening in which the hinge inserting portion is received such that the hinge receiving portion and the hinge inserting portion are connected in a hinge manner. The hinge receiving portion further includes a hinge receiving surface that extends from a vicinity of the engagement opening.

4 Claims, 8 Drawing Sheets

U.S. PATENT DOCUMENTS 7,607,198 B2 * 10/2009 Shimomura .................... 16/225

FOREIGN PATENT DOCUMENTS

| JP | 07-247923 | 9/1995 |
| JP | 08-281033 | 10/1996 |
| JP | 11-171041 | 6/1999 |
| JP | 2000-213429 | 8/2000 |
| JP | 2005-061382 | 3/2005 |
| JP | 2007/093419 | 4/2007 |
| WO | WO 2008/123392 | 10/2008 |

OTHER PUBLICATIONS

Office Action dated Apr. 1, 2010 in Chinese Application No. 200810087878.8.

European Extended Search Report dated Jul. 3, 2008 in EP Application No. 08005512.2.

* cited by examiner

AIR CLEANER UNIT FOR INTERNAL COMBUSTION ENGINE

CROSS REFERENCE TO RELATED APPLICATION

This application is based on Japanese Patent Application No. 2007-93729 filed on Mar. 30, 2007, the disclosure of which is incorporated herein by reference.

FIELD OF THE INVENTION

The present invention relates to an air cleaner unit for an internal combustion engine, the air cleaner unit having a casing constructed of plural case members.

BACKGROUND OF THE INVENTION

An air cleaner unit for an internal combustion engine is, for example, described in Japanese Unexamined Patent Application Publication No. 7-247923 (U.S. Pat. No. 5,569,311). The described air cleaner unit includes a casing and a filter element housed in the casing. The casing is constructed of a case body and a cap.

The case body has an opening and an element housing portion at the opening. The case body is disposed such that the opening is open in an upward direction of a vehicle. The cap is coupled to cover the opening of the case body with an opening thereof. The filter element is housed in the casing such that a peripheral portion of the filter element is interposed between a sealing surface of the case body and a sealing surface of the cap. The sealing surfaces of the case body and the cap are formed on peripheries of the openings thereof. Further, the peripheral portion of the filter element is compressed and deformed between the sealing surfaces of the case body and the cap for sealing the case body and the cap. As such, the filter element is held in the casing in a horizontal position that is perpendicular to an up and down direction of the vehicle.

Also, it is proposed to arrange an air cleaner unit such that a filter element is held in a vertical position for a reason of mounting in a vehicle. For example, due to the reason of mounting in a vehicle, a case body is disposed at a front end portion of the vehicle such that its opening opens in a vehicle rearward direction. In this case, the case body and the cap are coupled through a hinge part disposed at bottom portions of the case body and the cap for easing coupling work. However, because the hinge part is likely to be hidden or almost hidden by the case body and peripheral engine functional parts, it will be difficult to properly engage the hinge part. Also, if the engagement of the hinge part is insufficient, it is difficult to properly couple the cap to the case body such that a peripheral portion of a filter element is appropriately interposed between the sealing surfaces of the case body and the cap.

SUMMARY OF THE INVENTION

The present invention is made in view of the foregoing matter, and it is an object of the present invention to provide an air cleaner unit for an internal combustion engine of a vehicle, which is capable of improving working efficiency. It is another object of the present invention to provide an air cleaner unit for an internal combustion engine of a vehicle, which is capable of improving assemblability.

According to a first aspect of the present invention, an air cleaner unit for an internal combustion engine of a vehicle includes a filter element for filtering air to be introduced into the internal combustion engine and a casing including a first case member and a second case member. The first case member has a first opening, and the second case member has a second opening. The first case member and the second case member are coupled such that the first opening and the second opening are opposed to each other in a substantially horizontal direction and the filter element is housed in an element housing portion defined by at least one of the first and second openings. The first case member includes a hinge receiving portion. The second case member includes a hinge inserting portion. The hinge receiving portion and the hinge inserting portion are disposed under the element housing portion. The hinge receiving portion includes an engagement opening, and the hinge inserting portion is received in the engagement opening such that the hinge receiving portion and the hinge inserting portion are connected to each other in a hinge manner. The hinge receiving portion further includes a hinge receiving surface that extends from a vicinity of the engagement opening.

Accordingly, the hinge receiving surface serves as a guide when the hinge inserting portion is inserted into the engagement opening of the hinge receiving portion. Therefore, even when the engagement opening is not visible or not sufficiently visible from a person (e.g., worker) who assembles the second case member to the first case member, the hinge inserting portion is placed on the hinge receiving surface and is guided into the engagement opening of the hinge receiving portion by moving the second case member toward the first case member. Therefore, working efficiency improves. Further, since the hinge inserting portion is properly inserted into the hinge receiving portion, the first and second case members are properly assembled. Thus, assemblability improves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENT

An exemplary embodiment of the present invention will now be described with reference to FIG. 1 to 7. An air cleaner unit 1 for an internal combustion engine (hereinafter, the engine) is equipped with the engine for filtering intake air to be introduced into combustion chambers of the engine.

The air cleaner unit 1 generally includes a filter element (air cleaner element) 2 for filtering the intake air and a separable casing (housing) for housing the filter element 2. The casing is constructed of plural case members, which are coupled in a substantially horizontal direction of the vehicle, such as in a vehicle front and rear direction. In other words, the casing has a separation line along which the casing is separable into at least two case members, the separation line being substantially parallel to an up and down direction of the vehicle. For example, the horizontal direction of the vehicle is a direction parallel to a horizontal plane of the vehicle, the horizontal plane being parallel to a surface that the vehicle travels on. Also, the up and down direction of the vehicle is a direction substantially perpendicular to the horizontal plane of the vehicle. The up and down direction of the vehicle is, for example, generally parallel to a direction of gravity.

For example, the casing is constructed of an air cleaner case 3 and an air cleaner cap 4 as the case members. The air cleaner case (e.g., a first case member) 3 is disposed at a front end portion of the vehicle such that an opening (e.g., a first opening) of the case 3 faces in the substantially horizontal direction, such as in a vehicle rearward direction. The air cleaner cap (e.g., a second case member) 4 covers the first opening of the case 3. The cap 4 has an opening (e.g., a second opening) and is connected to the case 3 such that the first and second openings are opposed in the substantially horizontal direction, such as in the vehicle front and rear direction. The case 3 and the cap 4 are engaged with each other.

The case 3 has a first flange portion 11 on the periphery of the first opening. The cap 4 has a second flange portion 12 on the periphery of the second opening. The first and second flange portions 11, 12 provide sealing surfaces.

Figure 2A:
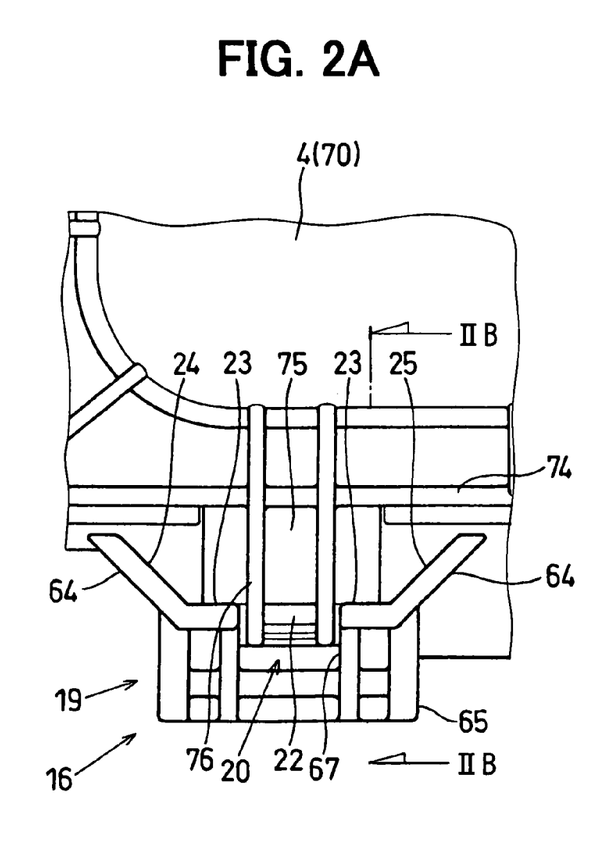
FIG. 2A is an enlarged view of a hinge part of a casing of the air cleaner unit according to the first embodiment.
Figure 2B:
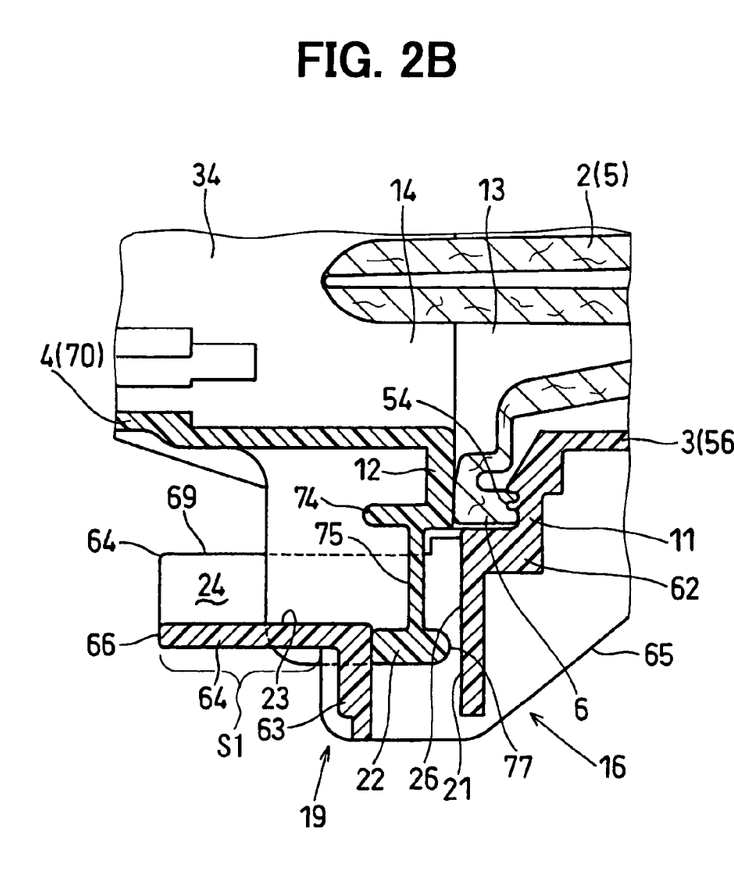
FIG. 2B is an enlarged cross-sectional view of the hinge part shown in FIG. 2A.
Figure 4:
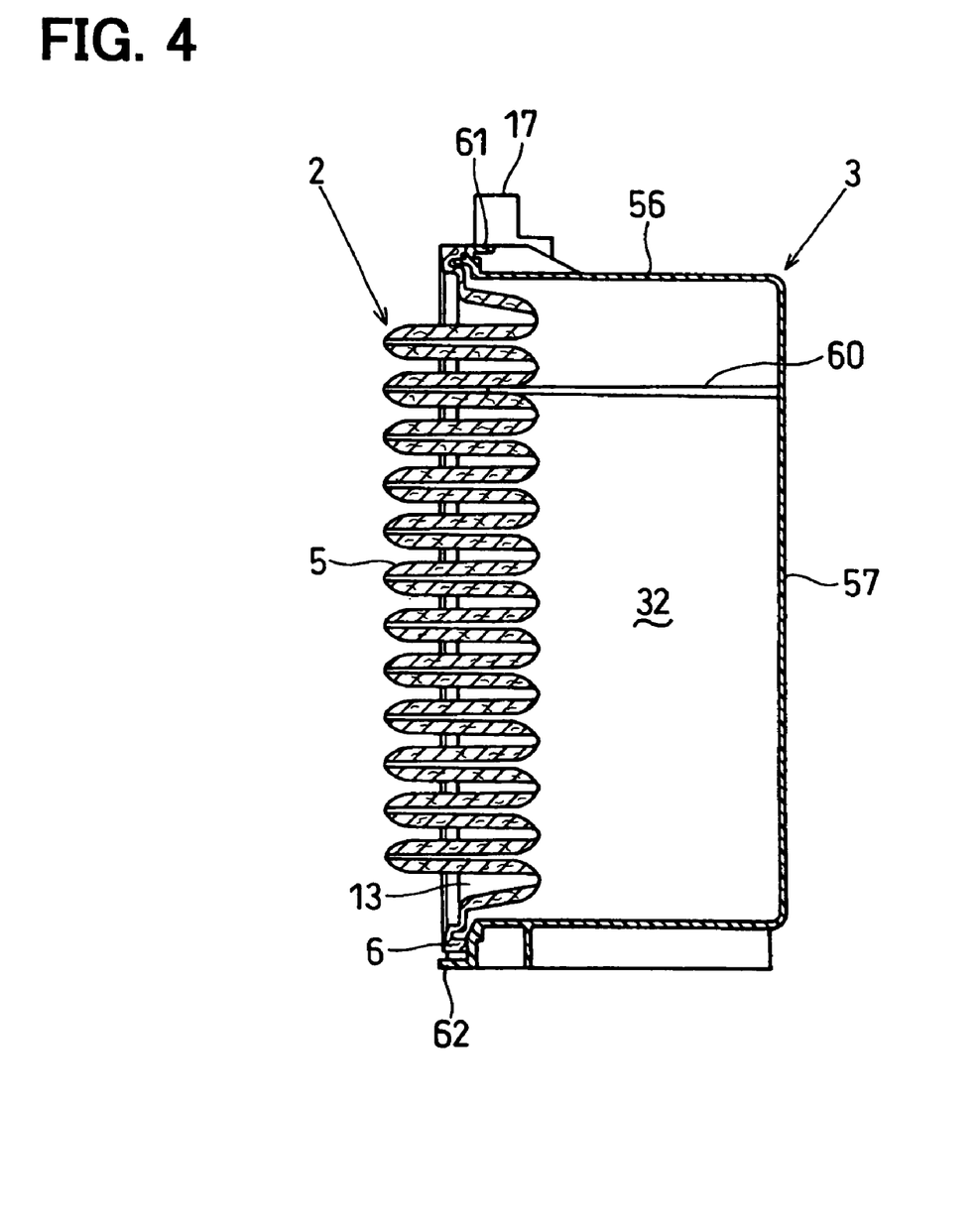
FIG. 4 is a cross-sectional view of the air cleaner case taken along a line IV-IV in FIG. 1.

As shown in FIGS. 2B and 4, the filter element 2 includes an element body 5 and a peripheral portion (peripheral sealing portion) 6 on a periphery of the element body 5. The peripheral portion 6, for example, has a substantially square or rectangular loop shape. The filter element 2 is disposed within the casing in a vertical position in a condition that the peripheral portion 6 is interposed between the sealing surface of the first flange portion 11 and the sealing surface of the second flange portion 12. That is, the filter element 2 is disposed substantially parallel to the vehicle up and down direction.

In the present embodiment, the case 3 and the cap 4 are coupled in the vehicle front and rear direction. The filter element 2 is held in the vertical position that is substantially perpendicular to the vehicle front and rear direction and substantially parallel to a vehicle right and left direction (i.e., vehicle width direction) that is perpendicular to the vehicle front and rear direction.

The first flange portion 11 of the case 3 is formed with an engagement projection 54. For example, the engagement projection 54 is formed entirely along the first flange portion 11, thus has a square or rectangular loop shape. The peripheral portion 6 of the filter element 2 is in pressed contact with the engagement projection 54, and is compressed.

Further, the case 3 forms a first element housing portion 13 on the periphery of the first opening. Likewise, the cap 4 forms a second element housing portion 14 on the periphery of the second opening. The first and second element housing portions 13, 14 forms a space having a substantially rectangular parallelepiped shape for housing the filter element 2.

Figure 5:
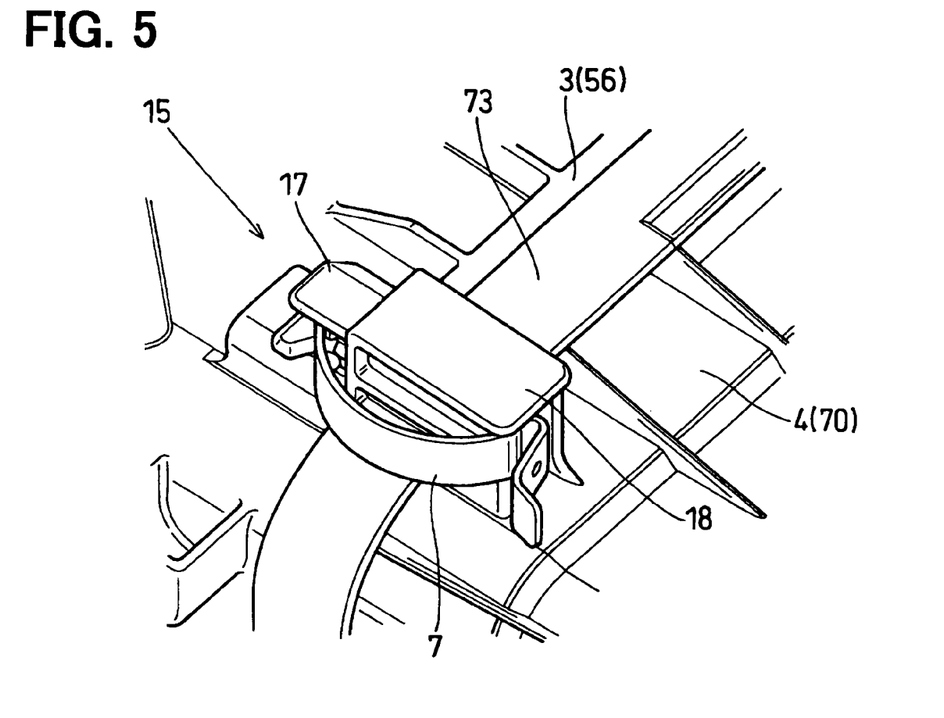
FIG. 5 is a perspective view of an upper engagement part of the casing according to the first embodiment.
Figure 6:
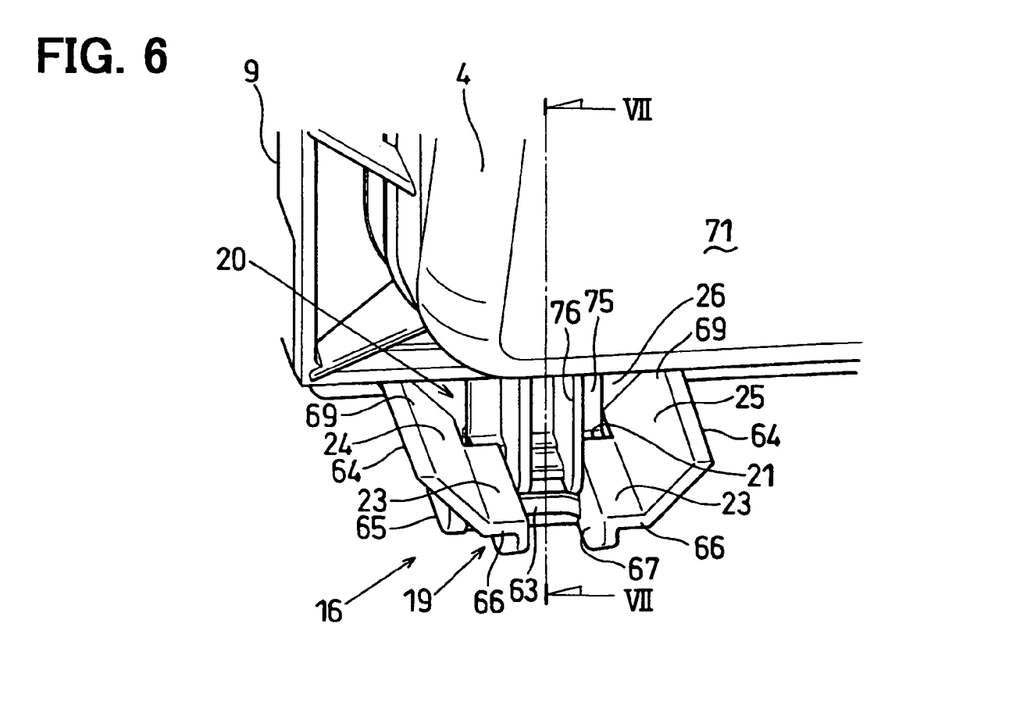
FIG. 6 is an enlarged perspective view of the hinge part of the casing according to the first embodiment.

As shown in FIG. 5, the casing has an upper engagement part 15 on its top portion. The upper engagement part 15 is secured by a metallic clamp 7. As shown in FIGS. 2A, 2B, 6 and 7, the casing has a lower engagement part 16 on its bottom portion. The lower engagement part 16 forms an engagement structure, that is, a hinge part that is connected in a hinge connection or a hinge manner.

The upper engagement part 15 is constructed of a first clamp-coupling portion 17 of the case 3 and a second clamp-coupling portion 18 of the cap 4. The first clamp-coupling portion 17 is formed adjacent to an upper end of the first flange portion 11. The second clamp-coupling portion 18 is formed adjacent to an upper end of the second flange portion 12. The first calm coupling portion 17 and the second clamp-coupling portion 18 are engaged with each other and further secured by a metallic clamp 7.

The lower engagement part 16 is constructed of a case hinge portion (hereinafter, hinge receiving portion) 19 of the case 3 and a cap hinge portion (hereinafter, hinge inserting portion) 20 of the cap 4. The hinge receiving portion 19 generally extends from the lower end of the first flange portion 11 in the vehicle rearward direction. The hinge inserting portion 20 generally extends from the lower end of the second flange portion 12 in a downward direction.

The hinge receiving portion 19 is formed with an engagement recess (hereinafter, hinge engagement opening) 21. The hinge inserting portion 20 is formed with an engagement projection (hereinafter, hinge shaft portion) 22. The hinge shaft portion 22 is inserted in the hinge engagement opening 21. Further, the hinge receiving portion 19 has a hinge receiving surface 23, right and left inclined guide surfaces 24, 25 and a hinge stopper (stopper wall) 26 on the periphery of the hinge engagement opening 21.

The casing has an inlet duct (first outside air introduction duct) 31 for introducing air, such as outside air, into the inside of the casing and an outlet duct (second outside air introduction duct) 33 for introducing the air that has passed through the filter element 2 inside of the casing toward an intake pipe of the engine.

For example, the inlet duct 31 is integrally formed with the case 3. The outlet duct 33 is integrally formed with the cap 4. The case 3 forms a first outside air introducing passage 32 therein through which the air introduced from the inlet duct 31 flows. The cap 4 forms a second outside air introducing passage 34 therein through which the air that has passed through the first outside air introducing passage 32 and the filter element 2 flows. The first outside air introducing passage 32 and the second outside air introducing passage 34 form an intake air passage. The intake air passage is in communication with intake air ports and combustion chambers of the engine.

The case 3 is integrated with a body-side member of a vehicle (e.g., a member mounted on the vehicle), such as a radiator 8 for the engine. In the present embodiment, the case 3 is made of a resin, and is integrally molded with a fan shroud (engine functional part) 9 of the radiator 8.

The engine is mounted in an engine compartment of a vehicle, such as an automobile. For example, the engine is a water-cooled gasoline engine that generates power from heat energy that is generated by combustion of a mixed air of the intake air and fuel in the combustion chambers. The engine has the intake pipe for introducing the intake air into the combustion chambers and an exhaust pipe for discharging exhaust gas from the combustion chambers. Further, the engine is provided with an engine cooling unit including an engine coolant circuit through which an engine coolant circulates.

The engine is constructed of a cylinder head, a cylinder block and the like. The cylinder head forms the intake air ports (intake ports) on one side and exhaust air ports (exhaust ports) on an opposite side. The intake air ports are opened and closed by poppet-like intake valves and the exhaust air ports are opened and closed by poppet-like exhaust valves.

The intake pipe is coupled to the intake air ports, and the exhaust pipe is coupled to the exhaust air ports. The cylinder block forms cylinder bores therein. Pistons are supported by a crankshaft to reciprocate in the cylinder bores. Further, a water jacket is formed inside of the cylinder head and the cylinder block, such as to surround peripheries of the cylinder bores.

The engine cooling unit generally includes the engine coolant circuit through which the engine coolant for cooling an engine main unit (e.g., the cylinder head, the cylinder block, etc.) flows and a heat exchanger air-blowing unit for forcibly introducing cooling air to the engine main unit.

The engine coolant circuit includes a water pump, a thermostat, the radiator 8 and the like. The water-cooled gasoline engine is constructed such that the engine coolant is forcibly circulated through the water jacket. Thus, the engine is cooled to an appropriate temperature such that components of the engine are efficiently operated.

The water pump is provided to forcibly introduce the engine coolant from the radiator 8 to the water jacket of the engine. The water jacket is rotationally driven by the crankshaft. The thermostat serves as an automatic control valve for controlling the temperature of the coolant. The thermostat is disposed on a radiation passage through which the engine coolant passing through the tubes of the radiator 8 flows. When the temperature of the engine coolant is lower than a predetermined temperature (e.g. 85° C.), the thermostat fully closes the radiation passage so that the engine coolant is introduced to a bypass passage while bypassing the radiator 8. As such, the engine is smoothly heated to the appropriate temperature by switching the passage by the thermostat.

In the engine compartment, the radiator 8 is mounted at a location where air is easily supplied, such as at the front end portion of the vehicle. For example, the radiator 8 is located immediately behind a front grill member that defines openings for introducing the cooling air into the engine compartment. The radiator 8 performs heat exchange between the cooling air that flows between tubes and the coolant that flows inside of the tubes, thereby cooling the coolant. The flow of the cooling air is created as the vehicle travels and by the heat exchanger air-blowing unit. Thus, the radiator 8 serves as a heat exchanger for cooling the coolant.

For example, the radiator 8 includes an upper tank 35, a lower tank 36 and a layered-type core between the upper tank 35 and the lower tank 36. The core is constructed by alternately layering the tubes and fins. The tubes form passages therein through which the coolant flows.

Each of the upper tank 35 and the lower tank 36 is provided with two shroud fixing portions for fixing the fan shroud 9 of the heat exchanger air-blowing unit to the radiator 8. The upper tank 35 has support pins 39 on its top wall. The support pins 39 project in an upward direction. The lower tank 36 has support pins 40 on its bottom wall. The support pins 40 project in the downward direction. The radiator 8 is fixed to parts (members) 43, 44 of the vehicle, such as front side members, a bracket, a frame, a body of the vehicle, and the like, through the support pins 39, 40. In the present embodiment, the parts 43, 44 are portions of the body of the vehicle.

Cylindrical rubber members (rubber mounts) 41, 42 are fitted on the peripheries of the support pins 39, 40. The rubber members 41, 42 serves as shock absorber when the radiator 8 is mounted to the parts 43, 44 through the support pins 39, 40.

The heat exchanger air-blowing unit is located between the engine and the radiator 8. For example, the heat exchanger air-blowing unit is located on a rear side of the radiator 8. The heat exchanger air-blowing unit generally includes an electric blower and the fan shroud 9 that surrounds the electric blower. The electric blower is operated to cause the cooling air to flow from the front grill member toward the engine through the core of the radiator 8.

The electric blower includes an axial-flow fan that generates the flow of air in an axial direction, and an electric motor 45 for rotating the axial-flow fan. The axial-flow fan includes a boss portion fitted to a rotation shaft of the electric motor 45 and blades radially extending from the boss portion.

The fan shroud 9 includes a shroud body 46 that surrounds a clearance between the radiator 8 and the electric fan. The fan shroud 9 is provided to restrict the flow of air created by the electric fan from bypassing the core of the radiator 8. That is, the fan shroud 9 is provided to direct the flow of air created by the electric fan to pass through the core of the radiator 8.

The fan shroud 9 is integrally formed of a resin material, such as a thermoplastic resin (e.g., polypropylene) and has a predetermined shape. Also, the case 3 of the air cleaner unit 1 is integrally formed with the fan shroud 9.

The fan shroud 9, which includes the shroud body 46 and the case 3, is a thermoplastic resin product (molded article) that is formed by integrally molding. For example, the fan shroud 9 is formed by melting resin material in the form of pellet, injecting the molten resin into a cavity defined in a die, cooling the injected resin in the cavity and removing the molded article from the die.

The shroud body 46 has a substantially polygonal tubular shape having a square or rectangular-shaped cross-section. The shroud body 46 includes a pair of transverse walls, such as an upper wall and a lower wall, which are opposed to each other in the up and down direction of the vehicle. Further, the shroud body 46 includes a pair of vertical walls, such as a right and left walls, which are opposed to each other in the substantially horizontal direction, such as the substantially right and left direction of the vehicle. The axial-flow fan is disposed in the fan shroud 4 such that the rotation axis is aligned with an axis of the tubular shaped shroud body 46. For example, the axial-flow fan is disposed such that the rotation axis is substantially parallel to the vehicle front and rear direction.

The upper wall of the shroud body 46 is integrally formed with fixing stays 49. The fixing stays 49 are fixed to shroud fixing portions of the upper tank 35 of the radiator 8 by fixing parts such as bolts. The lower wall of the shroud body 46 is integrally formed with fixing stays 50. The fixing stays 50 are fixed to shroud fixing portions of the lower tank 36 of the radiator 8 by fixing parts such as bolts.

The shroud body 46 has openings 51 at its middle portion, and through which the air blown by the electric fan passes. Further, the fan shroud 9 has fixing stays 52 and motor fixing portion 53 on an inner periphery of the fixing stays 52. The fixing stays 52 and the motor fixing portion 53 are integrally formed with the shroud body 46. The electric fan, particularly, the electric motor 45 is fixed to the motor fixing portion 53.

The air cleaner unit 1 is located at an upstream-most position of an air intake system of the engine, such as, an upstream-most position of the intake pipe of the engine. The filter element 2 is disposed in the casing of the air cleaner unit 1 for filtering the intake air passing through the intake air passage. The filter element 2 captures impurities, such as dusts, contained in the outside air, so as to reduce engine sliding abrasion.

The filter element 2 includes the element body 5 having a substantially square or rectangular shape and the peripheral portion 6 along the periphery of the element body 5. As shown in FIG. 4, the element body 5 is, for example, made of unwoven cloth that is folded or pleated in the up and down direction.

The peripheral portion 6 is integrally formed with the element body 5. The peripheral portion 6 forms a soft frame having a square or rectangular loop shape. The peripheral portion 6 includes an upper wall, a lower wall, side walls. The upper wall and the lower wall are located along sides that are opposed in the up and down direction that is perpendicular to a flow direction of the intake air in the casing, that is, axes of the first and second outside air introducing passages 32, 34. The side walls are located along sides that are opposed in the horizontal direction, such as in the right and left direction.

The peripheral portion 6 serves to seal with the sealing surface of the first flange portion 11 of the case 3 and the sealing surface of the second flange portion 12 of the cap 4. Further, the peripheral portion 6 is in pressed contact with the engagement projection 54 of the first flange portion 11.

Figure 1:
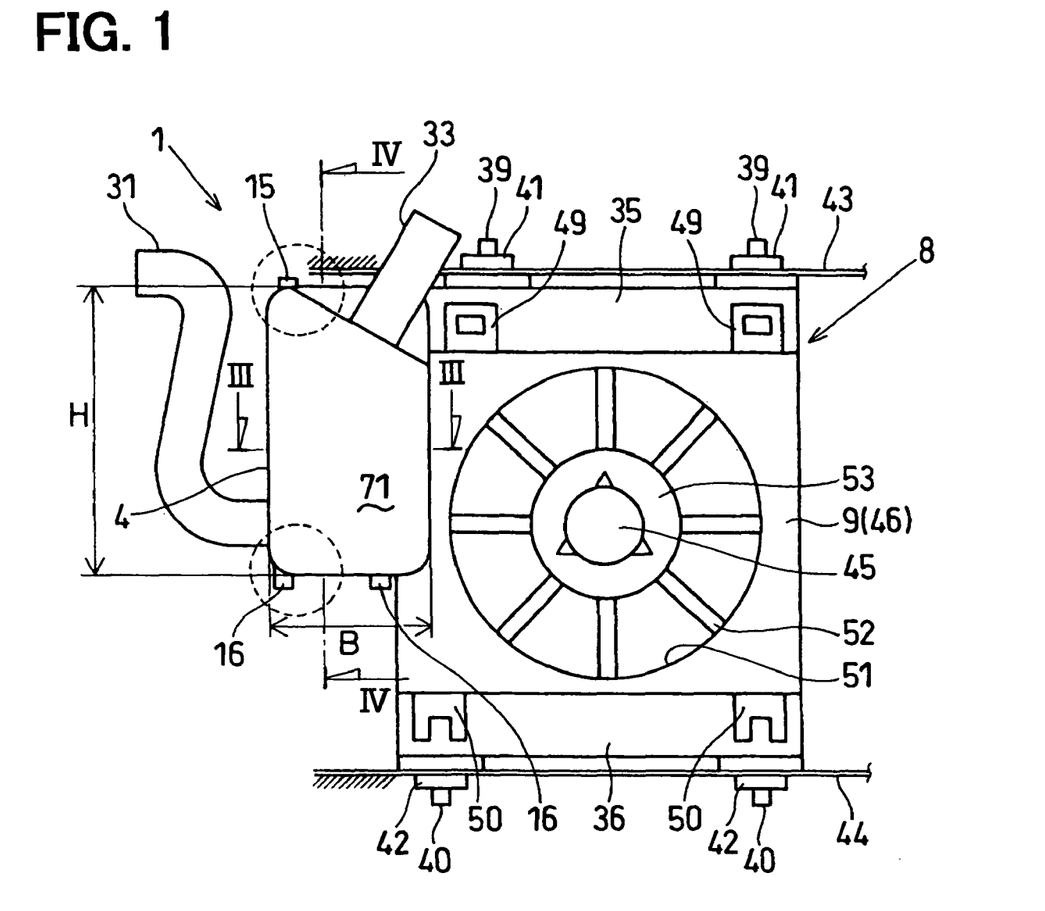
FIG. 1 is a view of an air cleaner unit integrated with a fan shroud of a radiator unit according to a first embodiment of the present invention.

The casing of the air cleaner unit 1 has a substantially rectangular parallelepiped box shape, and has a height H in the vehicle up and down direction, a width B in the vehicle right and left direction, and a depth in the vehicle front and rear direction, as shown in FIG. 1. The casing is constructed by coupling the first opening of the case 3 and the second opening of the cap 4, and securing the first and second clamp-coupling portions 17, 18 by the clamp 7.

The case 3 is a container-like member, and is integrally formed with the shroud body 46 of the fan shroud 9. In the embodiment shown in FIG. 1, the case 3 is integrally molded with the left wall of the shroud body 46. The fan shroud 9 is mounted to the radiator 8, which is fixed to the parts 43, 44 of the vehicle (e.g., vehicle body), through the fixing stays 49, 50. Therefore, the case 3 is fixed to the parts 43, 44 of the vehicle by fixing the fan shroud 9 to the radiator 8. In other words, the case 3 is fixed to the parts 43, 44 through the fan shroud 9 and the radiator 8.

Further, the case 3 is formed of the same resin material as the fan shroud 9. The case 3 includes a tubular side wall 56 having a polygonal tubular shape and defining the first outside air introducing passage 32 therein. The polygonal tubular shape, for example, has a square or rectangular-shaped cross-section.

Figure 3:
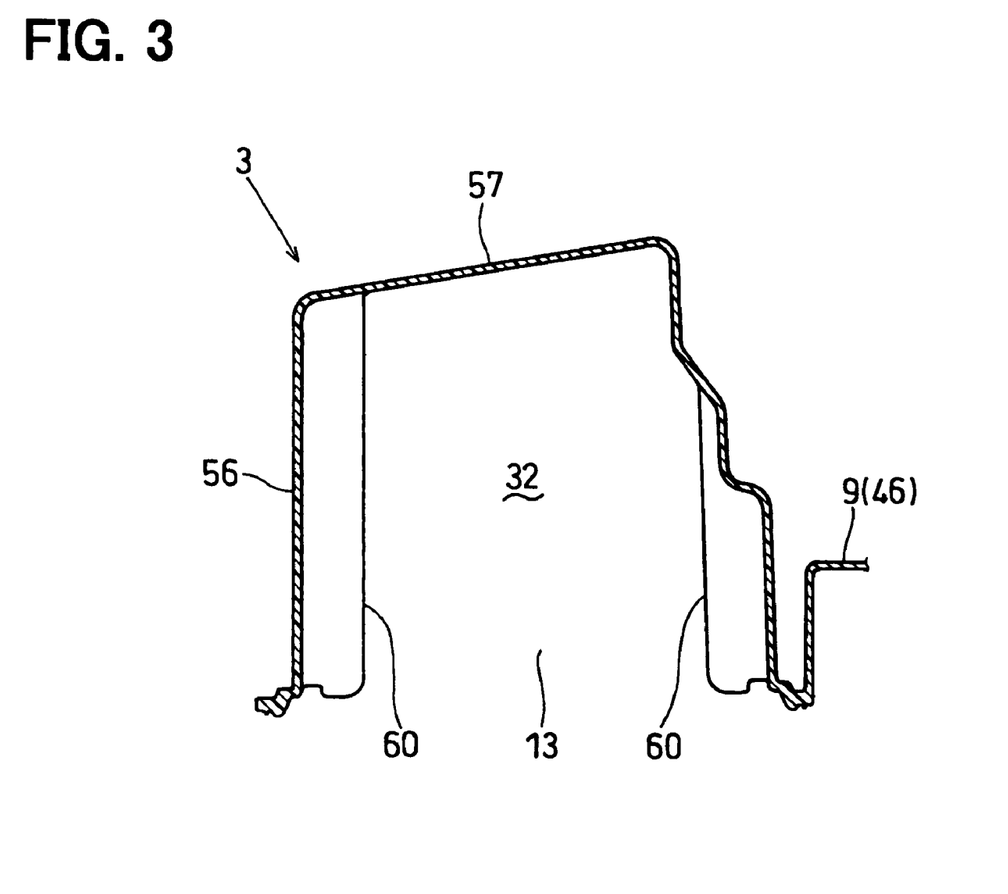
FIG. 3 is a cross-sectional view of an air cleaner case of the casing taken along a line III-III in FIG. 1.

As shown in FIG. 3, the tubular side wall 56 includes a left side wall portion and a right side wall portion. The left side wall portion and the right side wall portion are opposed in the substantially horizontal direction, such as in the vehicle right and left direction, and extend in the substantially up and down direction. Further, the tubular side wall 56 includes an upper wall portion and a lower wall portion. The upper wall portion and the lower wall portion are opposed in the vehicle up and right direction, and extend in the substantially horizontal direction.

The tubular side wall 56 defines an opening at its first axial end as the first opening of the case 3 and has an end wall 57 at its second axial end. That is, the first opening and the end wall 57 are opposed with respect to an axis of the tubular side wall 56. The first element housing portion 13 is defined by the first opening. The case 3 is disposed such that the first opening faces in the vehicle rearward direction, and the end wall 57 faces in the vehicle frontward direction. In other words, the case 3 is disposed such that the end wall 57 is located on a front side of the tubular side wall 56. That is, the end wall 57 serves as a front side wall of the casing. The end wall 57 extends in the substantially up and down direction.

The filter element 2 is assembled to the first element housing portion 13 of the case 3, and then the cap 4 is coupled to the first opening of the case 3. In this condition, therefore, the first opening of the case 3 is in communication with the second opening of the cap 4 and the second outside air introducing passage 34. In other words, the first element housing portion 13 of the case 3 is in communication with the second element housing portion 14 of the cap 4 while housing the filter element 2 between them.

The right and left side wall portions of the tubular side wall 56 and the end wall 57 extend in the substantially up and down direction of the vehicle. The upper and lower wall portions of the tubular side wall 56 extend in the right and left direction of the vehicle.

The lower wall portion of the tubular side wall 56 is provided with a duct coupling portion having a tubular shape. An air inlet is formed inside of the duct coupling portion. The air inlet opens in the downward direction.

The first flange portion 11 of the case 3 is formed on the periphery of the first opening that is defined at the first axial end of the tubular side wall 56. The first flange portion 11 provides a first element sealing portion. Further, the first flange portion 11 provides the first sealing surface that is opposed to the second sealing surface of the second flange portion 12 of the cap 4 through a predetermined clearance in which the peripheral portion 6 of the filter element 2 is disposed. The first sealing surface is formed along the first flange portion 11, and thus has a substantially rectangular or square-shaped loop shape. The first sealing surface of the first flange portion 11 is in closely contact with the clean side (e.g., front side) of the peripheral portion 6 of the filter element 2. Further, the first flange portion 11 is formed with the engagement projection 54, which has a square or rectangular looped shape, for example. The engagement projection 54 projects from the first sealing surface toward the filter element 2. The engagement projection 54 is in pressed contact with the peripheral portion 6 of the filter element 2.

The first sealing surface of the first flange portion 11 includes an upper portion and a lower portion that extend in the horizontal direction, such as in the vehicle right and left direction. The upper portion and the lower portion are respectively located at the ends of the upper wall portion and the lower wall portion of the tubular side wall 56. The first sealing surface of the first flange portion 11 further includes a right portion and a left portion that extend in the substantially up and down direction. The right portion and the left portion are respectively located at the ends of the right side wall portion and the left side wall portion of the tubular side wall 56. The right portion of the first flange portion 11 directly connects to the shroud body 46, as shown in FIG. 3.

Further, as shown in FIGS. 3 and 4, the case 3 has element support ribs 60 on the inner surfaces of the right and left side wall portions of the tubular side wall 56. The element support ribs 60 project to the inner side of the case 3, such as, toward the axis of the first outside air introducing passage 32. Each of the element support ribs 60 has a substantially plate-like shape and extend in the horizontal direction, such as in the vehicle right and left direction and in the front and rear direction.

The element support ribs 60 are formed to contact with the element body 5 of the filter element 2 when the filter element 2 is assembled to the first element housing portion 13 of the case 3, so that the filter element 2 is held only by the case 3 in the vertical position. That is, the element support ribs 60 serve as element engagement and holding portions.

The case 3 further has an upper reinforcement rib 61 and a lower reinforcement rib 62, as shown in FIG. 4. The upper reinforcement rib 61 projects from the upper portion of the first flange portion 11 toward the upper wall portion of the tubular side wall 56, that is, in a direction opposite to the peripheral portion 6 of the filter element 2. The lower reinforcement rib 62 projects from the lower portion of the first flange portion 11 in a direction opposite to the lower wall portion of the tubular side wall 56.

As shown in FIG. 5, the case 3 has the first clamp-coupling portions 17 at plural locations (e.g., two) adjacent to the upper side of the first flange portion 11. As shown in FIGS. 2A, 2B, 6, and 7, the case 3 has the hinge receiving portions (first hinge engagement portions) 19 at plural locations (e.g., two) adjacent to the lower side of the first flange portion 11.

Each of the hinge receiving portions 19 includes a hinge receiving body 63, right and left guide plates 64, and reinforcement ribs 65 and the like. The hinge receiving body 63 extends from a cap-side end of the lower reinforcement rib 62 in the downward direction, the cap-side end being on a side of the cap 4. The right and left guide plates 64 extends from the hinge receiving body 63 in the substantially horizontal direction, such as in the vehicle rearward direction. The reinforcement ribs 65 are formed as members for reinforcing the hinge receiving portion 19.

The hinge receiving body 63 has a polygonal tubular wall having a tubular shape with a square or rectangular-shaped cross-section, and forms the hinge engagement opening 21 on its inside. The hinge engagement opening 21 is a through hole with a square or rectangular-shaped cross-section, and penetrates through the hinge receiving body 63 in the up and down direction.

Figure 7:
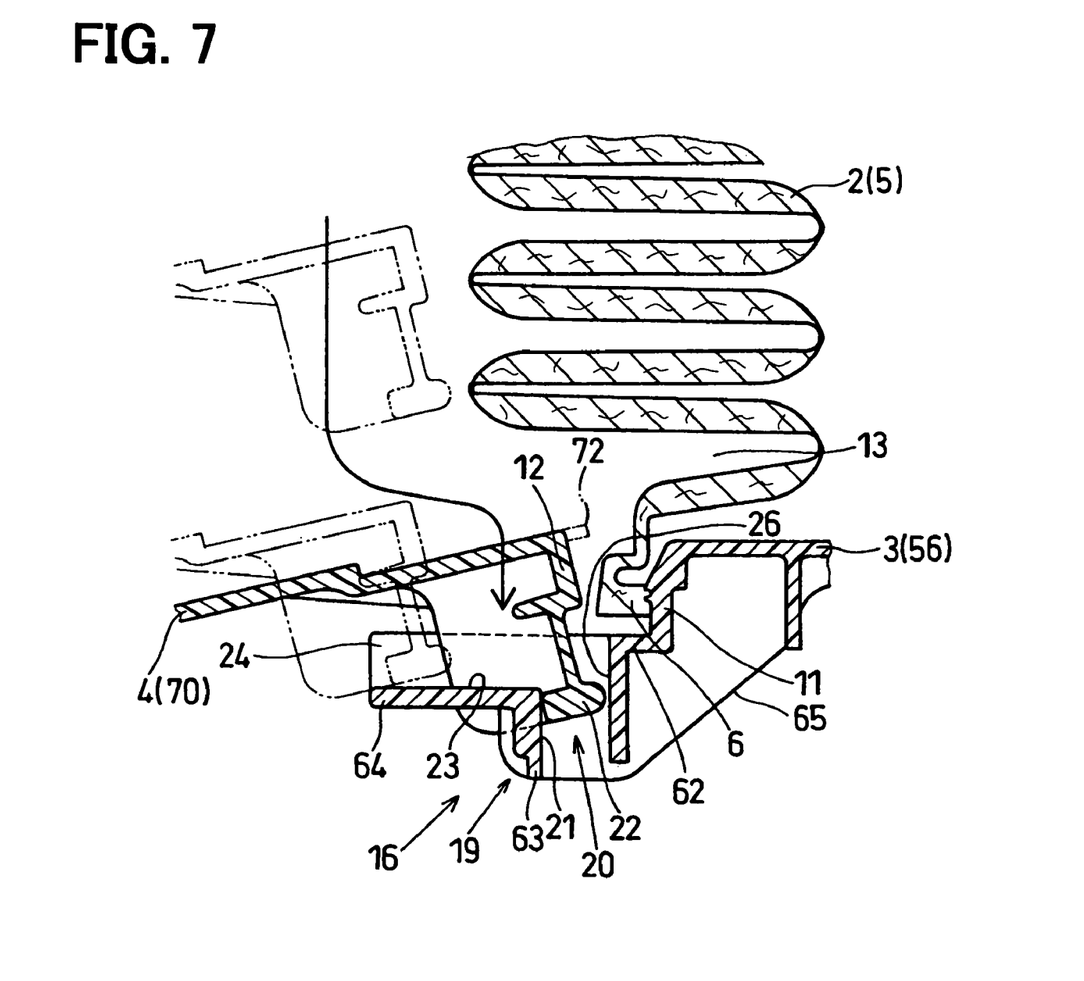
FIG. 7 is a cross-sectional view for showing a process of inserting a hinge inserting portion of an air cleaner cap into a hinge receiving portion of the air cleaner case according to the first embodiment.

As shown in FIGS. 2B and 7, the hinge engagement opening 21 is located lower than the first and second element housing portions 13, 14 of the casing. Therefore, when viewed from the top of the filter element 2 and the case 3, the hinge engagement opening 21 is hidden by the filter element 2 and the upper wall portion of the tubular side wall 56 and will not be visible. In other words, the hinge engagement opening 21 is located at a position overlapped with the first and second element housing portions 13, 14 when viewed from the top of the filter element 2 and the case 3.

A front portion of the tubular wall of the hinge receiving body 63 is formed with the hinge stopper 26. The hinge stopper 26 connects to the cap-side end of the reinforcement rib 62. The hinge stopper 26 provides a wall surface that restricts the hinge shaft portion 22 of the cap 4 from being moved more to the front side than the hinge engagement opening 21 when the hinge shaft portion 22 is inserted into the hinge engagement opening 21.

A rear portion of the tubular wall of the hinge receiving body 63 is formed with the right and left guide plates 64. The right and left guide plates 64 extend in the vehicle rearward direction from the rear portion of the tubular wall. The right and left guide plates 64 extend straight from a perimeter of the hinge engagement opening 21 in the horizontal direction, such as in the vehicle rearward direction, and form rear ends 66 on a side opposite to the hinge engagement opening 21.

The right and left guide plates 64 are formed symmetric with each other with respect to an axis that extends in the horizontal direction, such as in the vehicle front and rear direction. Each of the right and left guide plates 64 includes a plate portion (guide plate) and an inclined portion (inclined guide plate) extending from the plate portion. The inclined portion is inclined relative to the plate portion. The inclined portions of the right and left guide plates 64 are located on opposite sides with respect to the axis.

Further, the hinge receiving body 63 has a slit 67 between the plate portions of the right and left guide plates 64, as shown in FIG. 7. The slits 67 has a width smaller than a width of the hinge engagement opening 21 and a width of the hinge shaft portion 22, with respect to the vehicle right and left direction.

The upper surfaces of the plate portions of the right and left guide plates 64 define the hinge receiving surfaces 23 that serve as guide for guiding the hinge shaft portion 22 into the hinge engagement opening 21. The hinge receiving surface 23 are flat surfaces that extend in the substantially horizontal direction, such as in the vehicle front and rear direction, from the hinge engagement opening 21 to the ends 66. In the present embodiment shown in FIG. 6, for example, two hinge receiving surfaces 23 are separately formed on opposite sides of the slit 67. Alternatively, in a case where the hinge receiving body 63 does not have the slit 67, the hinge receiving body 63 has a single hinge receiving surface 23.

The dimension of the hinge engagement opening 21 with respect to the vehicle right and left direction is slightly larger than the width of the hinge shaft portion 22 of the cap 4. Also, the width of the hinge receiving surfaces 23 with respect to the vehicle right and left direction is slightly larger than the width of the hinge shaft portion 22 of the cap 4. The hinge receiving surfaces 23 are located at positions higher than the bottom surface of the hinge shaft portion 22 of the cap 4.

The inclined portions of the right and left guide plates 64 are integrally formed with right and left sides of the tubular wall of the hinge receiving body 63 and side ends of the plate portions. The inclined portions extend straight from the right and left sides of the perimeter of the hinge engagement opening 21 and the side ends of the plate portions while being inclined relative to the plate portions, that is, in the substantially horizontal direction. Further, the inclined portions are inclined such that a distance between them increases from the plate portions toward ends 69. In other words, the inclined portions are inclined such that the distance between them increases in the upward direction.

The inclined portions provides the right and left inclined guide surfaces 24, that serve to guide the hinge shaft portion 22 onto the hinge receiving surfaces 23 when the hinge shaft portion 22 is inserted into the hinge engagement opening 21. The inclined guide surfaces 24, 25 become high as the distance from the hinge engagement opening 21 and the sides of the hinge receiving surfaces 23 increases.

In the present embodiment, the ends 66 of the right and left guide plates 64 more project toward the cap 4, that is, in the rearward direction than the first and second element housing portions 13, 14. For example, substantially rear half sections of the right and left guide plates 64 project in the rearward direction toward the cap 4 more than the first and second element housing portions 13, 14. Thus, at least portions of the right and left guide plates 64 are visible without being blocked by the filter element 2 and the case 3.

Namely, the portions of the hinge receiving surfaces 23, such as rear half sections of the hinge receiving surfaces 23, and the portions of the right and left inclined guide surfaces 24, 25, such as rear half sections of the right and left inclined guide surfaces 24, 25 are located at positions without overlapping with the filter element 2 and the case 3 when viewed from the top of the filter element 2 and the case 3, in a condition where the cap 4 is removed from the case 3 and the filter element 2 is disposed in the first element housing portion 13. That is, the portions of the hinge receiving surfaces 23 and the portions of the right and left inclined guide surfaces 24, 25 are located at positions visible from the top of the filter element 2 and the case 3 or from the outside of the vehicle, such as from a front position of the front grill member of the vehicle.

For example, the guide plate 64 has a predetermined length such that at least a rear portion (e.g., portion S1) does not overlap with the filter element 2 with respect to the vehicle front and rear direction, as shown in FIG. 2B.

The cap 4 is detachably connected to the case 3. The cap 4 is, for example, made of the same resin material as the case 3. The cap 4 has a substantially container-like shape. The cap 4 includes a tubular side wall 70 having a polygonal tubular shape. The polygonal tubular shape, for example, has a square or rectangular-shaped cross-section. The cap 4 has an end wall 71 at a first axial end of the tubular side wall 70, and the second opening is formed at a second axial end of the tubular side wall 70. The tubular side wall 70 forms the second outside air introducing passage 34 therein.

The tubular side wall 70 of the cap 4 includes side wall portions, which are opposed with respect to the substantially horizontal direction, such as the vehicle right and left direction, and extend in the substantially up and down direction. Also, the tubular side wall 70 of the cap 4 includes an upper wall portion and a lower wall portion that is opposed to the upper wall portion with respect to the up and down direction. The upper wall portion and the lower wall portion extend in the substantially horizontal direction, such as in the vehicle right and left direction.

The cap 4 is disposed such that the end wall 71 extends in the substantially up and down direction and is located on a rear side of the tubular side wall 70. That is, the cap 4 is disposed such that the second opening opens in the vehicle frontward direction. Thus, the end wall 71 of the cap 4 corresponds to a rear wall of the casing. In the condition that the filter element 2 is fixed to the first element housing portion 13 and the cap 4 is coupled to the case 3, the second outside air introducing passage 34 and the second opening are in communication with the first outside air introducing passage 32 and the first opening of the case 3 through the element body 5.

The second flange portion 12 of the cap 4 is formed on the periphery of the second opening, which is defined on the second axial end of the tubular side wall 70. The second flange portion 12 is in a from of flange or frame surrounding the second opening. The second flange portion 12 provides the second element sealing portion for forming the second sealing surface that is opposed to the sealing surface of the first flange portion 11 of the case 3 through the peripheral portion 6 of the filter element 2. The second flange portion 12 has a substantially square or rectangular loop shape.

The second sealing surface of the second flange portion 12 air-tightly contacts a dust side (rear surface) of the peripheral portion 6 of the filter element 2. The second flange portion 12 has a rib 72 that projects from the sealing second surface toward the filter element 2. For example, the rib 72 is formed along the second sealing surface, and hence has a substantially square or rectangular loop shape. The rib 72 is provided to restrict shrinkage of the filter element 2.

For example, when the cap 4 is assembled to the case 3, the rib 72 contacts an inner surface of the peripheral portion 6 of the filter element 2 so as to restrict the peripheral portion 6 of the filter element 2 from shrinking toward the center of the casing. Since the shrinkage and positional displacement of the peripheral portion 6 of the filter element 2 are restricted by the rib 72, the first and second sealing surfaces are properly sealed with the peripheral portion 6.

In a case where the rib 72 interferes with an inserting operation of the hinge inserting portion 20 into the hinge engagement opening 21, it may be possible to partly eliminate the rib 72 at a position adjacent to the hinge inserting portion 20. Thus, working efficiency improves.

The cap 4 has a cap engagement wall 73 that extends from the second flange portion 12 over an outer surface of the peripheral portion 6 of the filter element 2 and an outer surface of the reinforcement rib 61 of the case 3, at positions corresponding to the ends of the upper wall portion and the upper portions of the right and left side wall portions of the tubular side wall 70, as shown in FIG. 5. The second clamp-coupling portions 18 are formed at plural locations (e.g., two) on the upper side of the second flange portion 12, and are engaged with the first clamp-coupling portions 17 of the case 3. The hinge inserting portions 20 (e.g., hinge fitting portions, second hinge engagement portions) are formed at plural locations (e.g., two) on the lower side of the second flange portion 12. The hinge inserting portions 20 are inserted into the hinge engagement opening 21 and connected to the hinge receiving portions 19 of the case 3 through the hinge connection.

Each of the hinge inserting portions 20 of the cap 4 includes a hinge holding portion (horizontal portion) 74, a hinge connecting portion (hinge leg portion) 75 and reinforcement ribs 76. The hinge holding portion 74 extends from the lower end of the second flange portion 12 horizontally in a direction opposite to the filter element 2. The hinge connecting portion 75 extends from a middle portion of the hinge holding portion 74 in the downward direction. The reinforcement ribs 76 serve to reinforce the second flange portion 12 and the hinge inserting portion 20.

The hinge shaft portion (hinge head) 22 is integrally formed with the hinge connecting portion 75. The hinge shaft portion 22 extends from the lower end of the hinge connecting portion 75 in the horizontal direction, such as in the vehicle front and rear direction. For example, the hinge shaft portion 22 extends from the hinge connecting portion 75 in both the frontward direction and the rearward direction.

The hinge shaft portion 22 is inserted in the hinge engagement opening 21 of the hinge receiving portion 19, and serves as a fulcrum (center of rotation) when the cap 4 is being fixed to the case 3. The front portion of the hinge shaft portion 22 forms a projection 77 having a rounded edge. A dimension of the hinge shaft portion 22 is smaller than a dimension of the hinge engagement opening 21, with respect to the vehicle front and rear direction. The width of the hinge shaft portion 22 is slightly smaller than the width of the hinge engagement opening 21, with respect to the vehicle right and left direction.

The hinge receiving portion 19 receives the hinge shaft portion 22 such that the cap 4 is rotatable about the hinge shaft portion 22. That is, the cap 4 is attachable to and detachable from the case 3 while rotating about the hinge shaft portion 22. In the present embodiment, the hinge receiving portion 19 of the case 3 and the hinge inserting portion 20 of the cap 4 provide the hinge part of the casing.

The clamp 7 is provided to tighten the first clamp-coupling portion 17 of the case 3 and the second clamp-coupling portion 18 of the cap 4, thereby to integrally fix the filter element 2, the case 3 and the cap 4. Namely, the clamp 7 serves as a fixing member. For example, the clamp 7 is constructed of a plate spring, a wire spring or the like. Also, it is not always necessary to fix the case 3 and the cap 4 by the first and second clamp-coupling portions 17, 18. For example, the case 3 and the cap 4 can be fixed by directly tightening the first and second flange portions 11, 12 without having the first and second clamp-coupling portions 17, 18. In addition, the fixing member is not limited to the metallic clamp 7. For example, the fixing member can be provided by any other clamp members such as a rubber band or the like. Further, a clamp can be integrally formed into one of the case 3 and the cap 4, and can be engaged with or inserted into an engagement portion of the other of the case 3 and the cap 4.

Next, a method of assembling the air cleaner unit 1 will be described with reference to FIGS. 1 to 7.

In the present embodiment, the filter element 2 and the cap 4 are fixed to the first opening of the case 3 that is integrally formed with the left side wall of the shroud body 46. The first opening of the case 3 is open at a position that is more to the rear side of the vehicle than the radiator 8. Thus, the filter element 2 is carried from the front side of the radiator 8 to the first opening of the case over the radiator 8 by a worker who is standing in front of the front grill member.

The lower side of the peripheral portion 6 of the filter element 2 is brought into contact with the lower portion of the first sealing surface of the first flange portion 11 of the case 3. The lower side of the peripheral portion 6 of the filter element 2 is in pressed contact with the lower side of the engagement projection 54 of the case 3.

Then, the filter element 2 is rotated such that the upper side of the peripheral portion 6 of the filter element 2 is moved forward. Thus, the upper side of the peripheral portion 6 of the filter element 2 is brought into contact with the upper portion of the sealing surface of the first flange portion 11. At this time, the element support ribs 60 of the case 3 enter between the predetermined folds of the element body 5. Since the element body 5 is received by the element support ribs 60 of the case 3, the movement of the filter element 2 in an assembling direction is regulated.

Further, the upper side and the right and left sides of the peripheral portion 6 are in pressed contact with the upper side and the right and left sides of the engagement projection 54 to be compressed the engagement projection 54. Since the element body 5 of the filter element 2 is engaged with the element support ribs 60 of the case 3, the filter element 2 is held in the vertical position only by the case 3, as shown in FIG. 4.

Next, the cap 4 is carried from the front side of the radiator 8 to the first opening of the case 3 over the radiator 8. In this case, the filter element 2 has been already held in the case 3. It will be difficult to see the hinge engagement opening 21 of the hinge receiving portion 19 from the front side because the view of the worker is blocked by the filter element 2, the case 3 and other peripheral engine functional devices. That is, it will be necessary to insert the hinge shaft portion 22 of the cap 4 into the hinge engagement opening 21 in a condition that the hinge engagement opening 21 is invisible.

In the present embodiment, the hinge receiving portion 19 has the hinge receiving surfaces 23 and the right and left inclined guide surfaces 24, 25. The hinge receiving surfaces 23 extend substantially straight in the vehicle rearward direction from the perimeter of the hinge engagement opening 21 to a position where it is visible from the front side of the vehicle. Further, the right and left inclined guide surfaces 24, 25 extend substantially straight in the vehicle rearward direction from the right and left sides of the hinge engagement opening 21 to a position where it is visible from the top of the filter element 2 and the case 3 or from the outside of the vehicle.

Namely, the position for placing the hinge shaft portion 22 is visible from the top of the filter element 2 and the case 3 or from the outside of the vehicle. Therefore, the hinge shaft portions 22 of the cap 4 can be easily placed on the hinge receiving surfaces 23 of the case 3.

Further, since the right and left inclined guide surfaces 24, 25 are provided on opposite sides of the hinge receiving surfaces 23, the hinge shaft portions 22 can be guided onto the hinge receiving surfaces 23 along the right and left inclined guide surfaces 24, 25, even if the hinge shaft portion 22 is put on a position displaced from the hinge receiving surfaces 23 in the vehicle right and left direction. Furthermore, because the hinge shaft portions 22 can slide along the right and left inclined guide surfaces 24, 25 by gravitation as the worker reduces a force holding the cap 4, the hinge shaft portions 22 can be properly placed on the hinge receiving surfaces 23.

Thus, the hinge shaft portions 22 are placed on the hinge receiving surfaces 23, and then the cap 4 is moved forward, such as, toward the case 3 so that the hinge shaft portions 22 come close to the hinge stoppers 26. Thus, when the hinge shaft portions 22 contact the hinge stoppers 26 or before the hinge shaft portions 22 contact the hinge stoppers 26, the hinge shaft portions 22 are received in the hinge engagement openings 21.

Even when the hinge shaft portions 22 are placed on the right and left inclined guide surfaces 24, 25, the hinge shaft portions 22 are directly received in the hinge engagement openings 21 after being guided along the right and left inclined guide surfaces 24, 25.

Next, the cap 4 is rotated about the hinge shaft portions 22 received in the hinge engagement openings 21. Thus, the upper side of the cap 4 is moved forward, and the second clamp-coupling portions 18 are engaged with the first clamp-coupling portions 17 of the case 3. At this time, the cap engagement wall 73 of the cap 4 is fitted on the outer surface of the peripheral portion 6 of the filter element 2 and the outer surfaces of the reinforcement ribs 61 of the case 3.

Then, the first and second clamp-coupling portions 17, 18 are tightened by the clamps 7. As such, the filter element 2, the case 3 and the cap 4 are integrated. In this condition, since the peripheral portion 6 of the filter element 2 is disposed between the first sealing surface of the first flange portion 11 and the second sealing surface of the second flange portion 12, the filter element 2 is housed and held in the casing in the vertical position that is parallel to the up and down direction and perpendicular to the horizontal direction. Further, the clearance between the first and second sealing surfaces is air-tightly sealed by the peripheral portion 6 of the filter element 2.

Next, an operation of the air cleaner unit 1 of the present embodiment will be described. When the engine is started, and the cylinders of the engine are shifted from an exhaust step to an air intake step while the intake valves are opened and the pistons are descended, a negative pressure, which is lower than an atmospheric pressure, of the combustion chambers of the cylinders is increased with the descendent of the pistons. Thus, the mixed air is drawn from the intake ports that are open.

At this time, the air, such as the outside air, is introduced in the first outside air introducing passage 32 of the case 3 from the first outside air introduction duct 31, and passes through the element body 5 of the filter element 2. Thus, impurities of the air are captured by the element body 5.

The clean air that has passed through the element body 5 is drawn into the combustion chambers of the cylinders through the second outside air introducing passage 34 of the cap 4, the second outside air introduction duct 33, the inside of the air intake pipe (intake air passage) and the intake ports. Since the clean air is drawn into the engine, the sliding abrasion of the engine due to the impurities is reduced. Thus, failure of the engine is reduced.

Next, an effect of the air cleaner unit 1 of the present embodiment will be described, in comparison with a comparative example shown in FIGS. 8A, 8B and 9.

As described in the above, the casing is constructed of the case 3 and the cap 4. The casing includes the upper engagement parts 15 that are secured by the clamps 7 on the top side. Each of the upper engagement parts 15 is constructed of the first clamp-coupling portion 17 of the case 3 and the second clamp-coupling portion 18 of the cap 4. Also, the casing includes the lower engagement parts 16 at the lower side. Each of the lower engagement parts 16 is constructed of the hinge receiving portion 19 of the case 3 and the hinge inserting portion 20 of the cap 4.

The hinge receiving portion 19 extends from the lower wall portion of the tubular side wall 56 of the case 3, such as, the lower end of the first flange portion 11, in the vehicle rearward direction. The hinge inserting portion 20 extends from the lower wall portion of the tubular side wall 70 of the cap 4, such as, the lower end of the second flange portion 12 in the downward direction.

The hinge receiving portion 19 and the hinge inserting portion 20 are connected to each other in the hinge manner that the hinge shaft portion 22 of the hinge inserting portion 22 is received in the hinge engagement opening 21 of the hinge receiving portion 19.

The hinge engagement opening 21 is located at the position overlapping with the first and second element housing portions 13, 14 when viewed from the top of the case 3. Thus, when the cap 4 is assembled to the case 3 after the filter element 2 is assembled to the first element housing portion 13, the hinge engagement opening 21 is hidden by the filter element 2, the upper wall portion of the case 3, and the engine functional parts located on the periphery of the case 3. Namely, the hinge shaft portions 22 of the cap 4 are need to be inserted into the hinge engagement openings 21 which are hidden.

Figure 8A:
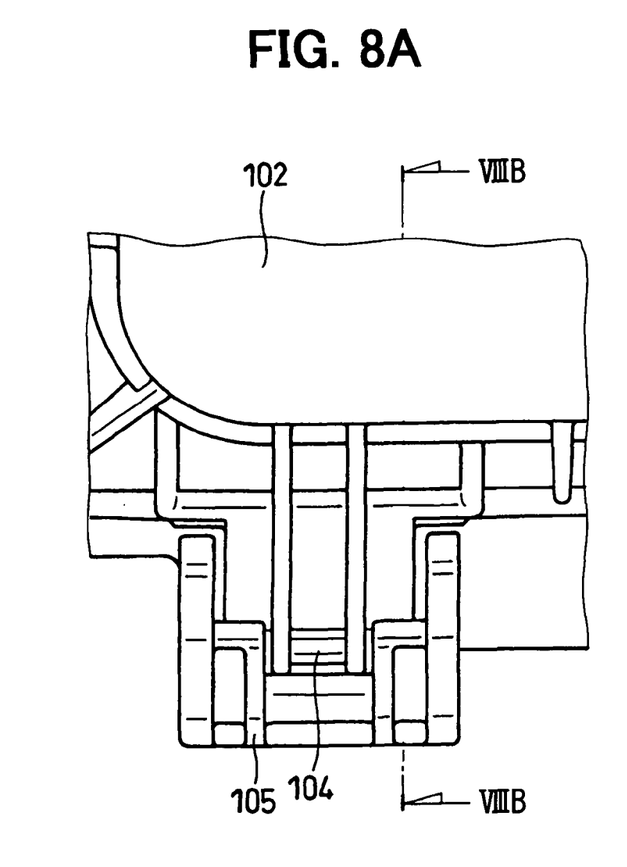
FIG. 8A is an enlarged view of a hinge part of a casing of an air cleaner unit of a comparative example.
Figure 8B:
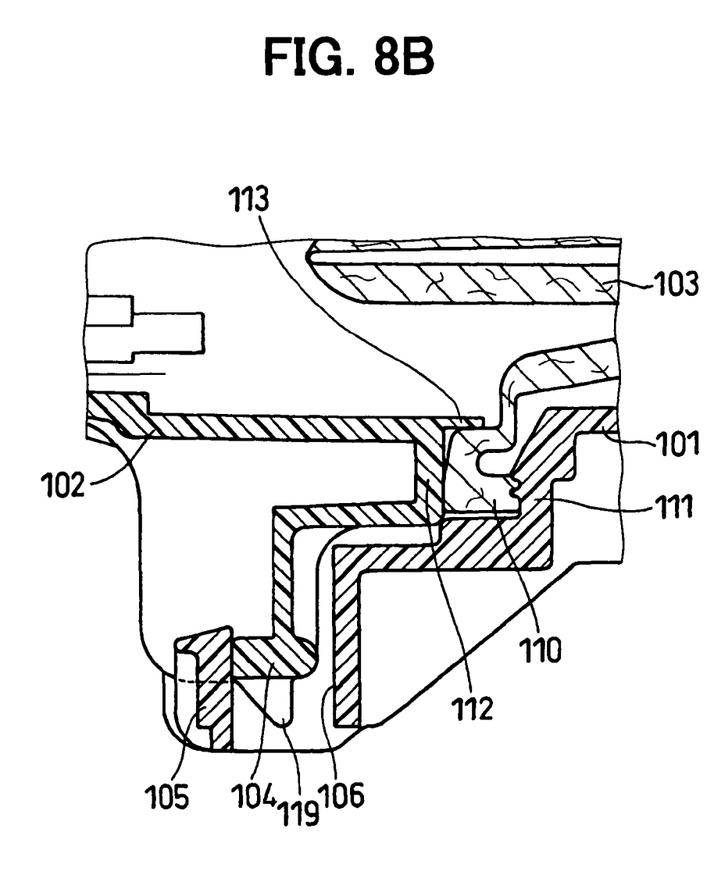
FIG. 8B is a cross-sectional view taken along a line VIIIB-VIIIB in FIG. 8A.
Figure 9:
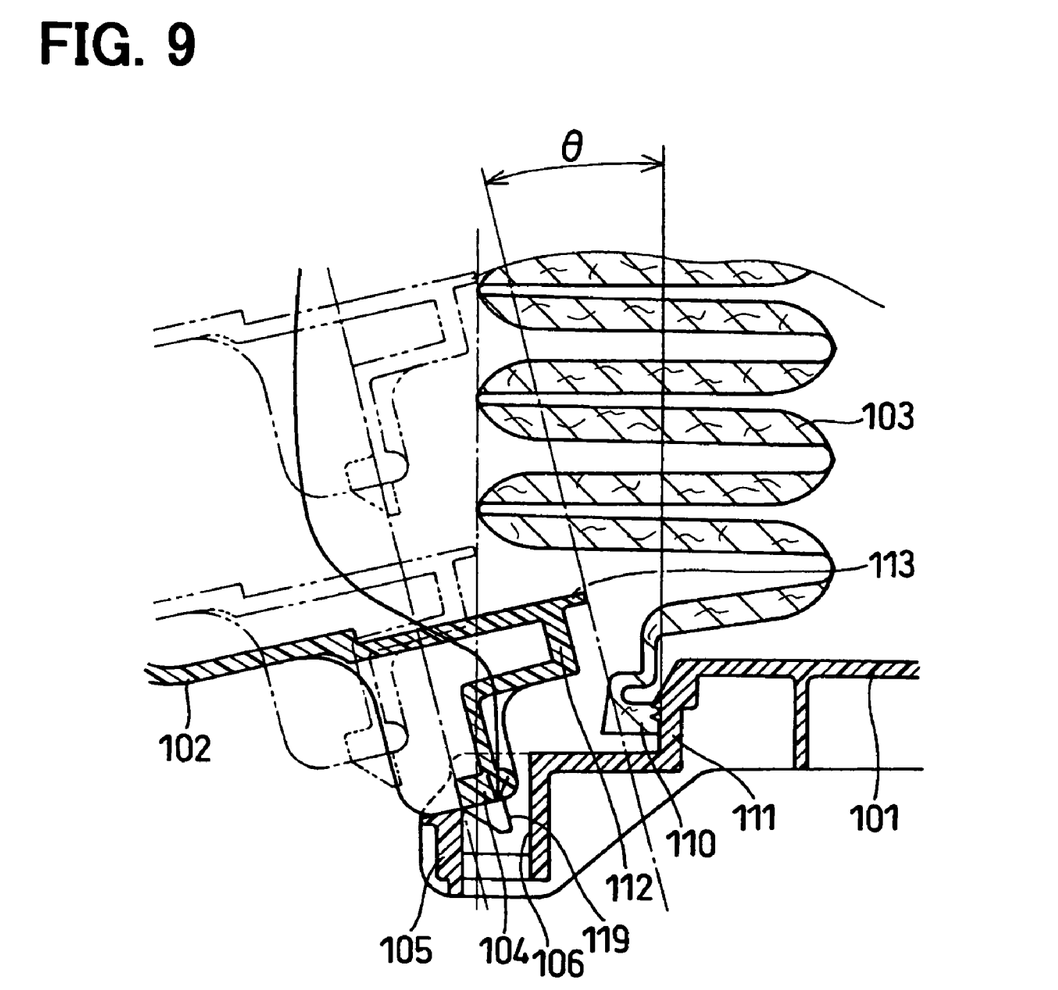
FIG. 9 is a cross-sectional view for showing a process of inserting a hinge inserting portion of an air cleaner cap into a hinge engagement hole of an air cleaner case of the comparative example.

For example, in a hinge part of the comparative example, as shown in FIGS. 8A, 8B and 9, a hinge part is located at the bottom side of a case 101 and a cap 102. Thus, it is difficult for a worker to see a hinge engagement opening 106 of a hinge receiving portion 105 of the case 101. For example, a hinge engagement opening 106 of a hinge receiving portion 105 is hidden or almost hidden by a case 101, a filter element 103 or engine functional parts on the periphery.

As shown in FIG. 9, a hinge inserting portion 104 of the cap 102 needs to be inserted into the hinge engagement opening 106 while inclining the cap 102 at a predetermined angle θ relative to a first sealing surface of a first flange portion 111 of the case 101 to avoid a rib 113 of the cap 102 from interfering with the filter element 103. However, since the hinge engagement opening 106 is invisible or almost invisible, it is difficult to insert the hinge inserting portion 104 into the hinge engagement opening 106. Further, it is difficult to fix the cap 102 to the case 101 while avoiding the rib 113 from interfering with the filter element 103.

Further, it is difficult to visibly check whether the hinge inserting portion 104 is properly inserted in the hinge engagement opening 106 from the front side of the vehicle. If an engagement portion of the case 101 and an engagement portion of the cap 102 are clamped in a condition where the hinge inserting portion 104 is not properly received in the hinge engagement opening 106, the first sealing surface of the first flange portion 111 of the case 101 and a second sealing surface of a second flange portion 112 of the cap 102 will not be properly sealed with a peripheral portion 110 of the filter element 103. For example, if the assembled condition of the case 101 and the cap 102 is insufficient or improper, the peripheral portion 110 of the filter element 103 is likely to be deformed, such as twisted. In this case, it is difficult to properly seal the first and second sealing surfaces with the peripheral portion 110 of the filter element 103.

In the air cleaner unit 1 of the present embodiment, the hinge receiving portion 19 has a guide mechanism constructed of the hinge receiving surfaces 23 and the right and left inclined guide surfaces 24, 25 on the periphery of the hinge engagement opening 21. Specifically, the hinge receiving surfaces 23 and the right and left inclined guide surfaces 24, 25 are formed to surround three sides of the hinge engagement opening 21, such as the rear side and the right and left sides of the hinge engagement opening 21. The hinge receiving surfaces 23 serve as guides when the hinge shaft portions 22 are inserted into the hinge engagement opening 21. The right and left inclined guide surfaces 24, 25 serve to guide the hinge shaft portions 22 onto the hinge receiving surfaces 23. Also, the right and left inclined guide surfaces 24, 25 serve to guide the hinge shaft portions into the hinge engagement opening 21. Further, the hinge receiving surfaces 23 extend from the perimeter of the hinge engagement opening 21, which is located the position hidden by the filter element 2 and the case 3 or the position difficult to be seen from the top of the filter element 2 and the case 3, in the vehicle rearward direction to the position visible from the top of the filter element 2 and the case 3 or from the outside of the vehicle. Also, the right and left inclined guide surfaces 24, 25 extend from the hinge stopper 26, which is located at the position hidden by the filter element 2 and the case 3 or the position difficult to be seen from the top of the filter element 2 and the case 3, in the vehicle rearward direction to the position visible from the top of the filter element 2 and the case 3 or from the outside of the vehicle.

That is, the hinge receiving surfaces 23 can be partly seen from the top of the filter element 2 and the case 3 or from the outside of the vehicle. Therefore, the hinge shaft portions 22 can be easily placed on the hinge receiving surfaces 23. Even in the condition where the hinge engagement openings 21, that is, the engagement position between the hinge engagement opening 21 and the hinge shaft portion 22 is not visible from the top of the filter element 2 and the case 3 or from the outside of the vehicle, the hinge shaft portion 22 is easily inserted into the hinge engagement opening 21 as a function of the hinge receiving surfaces 23.

Further, the hinge receiving surfaces 23 are located at positions higher than the bottom surface of the hinge shaft portion 22. Thus, the hinge shaft portion 22 is dropped in the hinge engagement opening 21 by drawing the hinge shaft portion 22 toward the case 3 along the hinge receiving surfaces 23. The worker can feel the dropping of the hinge shaft portion 22 by the touch. At this time, the hinge shaft portion 22 is fitted in the hinge engagement opening 21 and thus connected in the hinge manner. As such, the proper connection of the case 3 and the cap 4 can be checked.

Further, since the stopper 26 is provided on a side opposite to the hinge receiving surfaces 23 with respect to the hinge engagement opening 21 and the upper end of the stopper 26 is located higher than the hinge receiving surfaces 23, the hinge shaft portion 22 is properly directed into the hinge engagement opening 21. Also, since the hinge receiving surfaces 23 have sufficient length in the vehicle rearward direction, the hinge shaft portion 22 is smoothly guided into the hinge engagement opening 21 along the hinge receiving surfaces 23. For example, the length of the hinge receiving surfaces 23 is longer than the dimension of the hinge shaft portion 22 with respect to the vehicle front and rear direction.

Accordingly, efficiency of assembling the cap 4 to the case 3 improves. Further, the case 3 and the cap 4 can be properly connected. Since the case 3 and the cap 4 are properly connected, the peripheral portion 6 of the filter element 2 is properly sealed with the first and second sealing surfaces. That is, it is less likely that the peripheral portion 6 will be deformed or twisted.

Since the clearance between the first and second sealing surfaces is properly sealed by the peripheral portion 6 of the filter element 2, it is less likely that the foreign materials such as dusts will enter the intake air passage and further the combustion chambers of the engine. Accordingly, a fault, such as an engine malfunction and the like due to engine sliding abrasion and the like is reduced.

(Modifications)

In the above embodiment, the case 3 is integrally molded with the fan shroud 9. However, the case 3 can be integrally formed with or connected to another engine functional part, such as an engine head cover, an intake manifold, a throttle body, the tank of the radiator or the like. Also, the vehicle body-side member can be one of the vehicle body, a frame of the vehicle, and the fan shroud 9.

In the above embodiment, the filter element 2 is formed of unwoven cloth. However, the filter element 2 can be formed of another material such as paper, metallic mesh member, or the like.

The casing of the air cleaner unit 1 can be made of a resinous material that includes fibers for increasing the strength, such as glass fiber and carbon fiber. In this case, the case 3 and the cap 4 are made by mixing a filler material, such as glass fiber, carbon fiber, aramid fiber, boron fiber, into a resin that is the same as the resin of the engine functional part that is integrally formed with the case 3. Further, the case 3 and the cap 4 can be made of different materials.

In the above embodiment, the hinge receiving surfaces 23 and the right and left inclined guide surfaces 24, 25 are disposed to surround three sides of the periphery of the hinge engagement opening 21. Alternatively, the hinge receiving surface can be formed to entirely surround the periphery of the hinge engagement opening 21. Also, one of or both the right and left inclined guide surfaces 24, 25 can be eliminated. Further, the hinge receiving portion 19 can have a tapered portion on the periphery of the hinge engagement opening 21. For example, the tapered portion may be formed to decline toward the hinge engagement opening 21. Also, the tapered portion may be formed such that its highest portion is coplanar with the end of the hinge receiving surface 23, the end being adjacent to the hinge engagement opening 21.

In the above embodiment, the hinge receiving surfaces 23 are flat surfaces that extend from the hinge engagement opening 21 toward the ends 66 in the substantially horizontal direction, such as in the vehicle rearward direction. Alternatively, the hinge receiving surfaces 23 may be inclined relative to the substantially horizontal direction. For example, the hinge receiving surfaces 23 may be sloped down toward the hinge engagement opening 21.

In the above embodiment, the slit 67 is formed between the plate portions of the right and left guide plates 64 with the width smaller than the width of the hinge shaft portion 22 and the width of the hinge engagement opening 21. Also, the bottom surface of the hinge shaft portion 22 is a flat surface. However, in a case that the slit 67 is in communication with the hinge engagement opening 21, the bottom surface of the hinge shaft portion 22 can be formed with an engagement projection (e.g., projection 119 in FIG. 8B) that engages with the slit 67. In this case, the engagement projection can be guided along the slit 67 while the hinge shaft portion 22 is slid along the hinge receiving surfaces 23 toward the hinge engagement opening 21. Therefore, assembling efficiency improves.

Further, the slit 67 may be eliminated. In this case, the plate portions of the right and left guide plates 64 are integrated into a single plate.

In the above embodiment, the case 3 is disposed such that the first opening is open in the vehicle rearward direction. However, the case 3 can be disposed in a different direction. For example, the case 3 can be disposed such that the first opening is open in the frontward direction, the leftward direction, the rightward direction, or the like. The cap 4 is disposed such that the second opening is open in a direction opposed to the direction of the first opening of the case 3.

In the above embodiment, the hinge receiving surfaces 23 of the case 3 extend in the direction same as the direction in which the first opening is open. Alternatively, the hinge receiving surfaces 23 may be formed to extend in a direction that is inclined at a predetermined angle relative to the direction in which the first opening is open. Likewise, the right and left inclined guide surfaces 24, can be formed to extend in a direction that is inclined at a predetermined angle relative to the direction in which the first opening is open.

In the above embodiment, the hinge receiving surfaces 23 and the right and left inclined guide surfaces 24, 25 are provided by the right and left guide plats 64. Alternatively, the hinge receiving surfaces 23 and the right and left inclined guide surfaces 24, 25 can be provided by a guide block that has a thickness greater than that of the right and left guide plates 64. Also, one of the right and left inclined portions, that is, one of the right and left inclined guide surfaces 24, 25 may be eliminated. Further, both the right and left inclined portions may be eliminated.

In the above embodiment, the element housing portion for housing the filter element 2 is provided by the first and second element housing portions 13, 14, which are respectively formed in the case 3 and the cap 4. Alternatively, the element housing portion can be formed by one of the first opening of the case 3 and the second opening of the cap 4.

In the above embodiment, the filter element 2 is held in the case 3 by the element support ribs 60 before the cap 4 is assembled to the case 3. In this case, it is not necessary for the worker to hold the filter element 2 while inserting the hinge shaft portions 22 of the cap 4 into the hinge engagement openings 21. However, element support portions such as the element support ribs 60 may be eliminated, through the worker may need to hold the filter element 2 to the case 3 while inserting the hinge shaft portions 22 into the hinge engagement openings 21.

In the above embodiment, the filter element 2 is held in the vertical position. However, the filter element 2 can be held in an inclined vertical position inclined at a predetermined angle relative to the vehicle up and down direction or the up and down direction of the casing. That is, the vertical position of the filter element 2 is not limited to an exactly vertical position that is parallel to the direction of gravity, but can be a position that is generally parallel to the up and down direction of the vehicle, that is, includes a position inclined from the vertical direction. In the case where the filter element 2 is disposed in the inclined vertical position, the first and second sealing surfaces are disposed to incline at the same angle of the inclination of the filter element 2.

In the above embodiment, the case 3 and the cap 4 have the separation line in the vehicle up and down direction, such as in a direction of gravity. However, the case 3 and the cap 4 may have the separation line that is inclined relative to the direction of gravity or includes a bent.

Further, the first outside air introduction duct 31 can be coupled rotatably to the duct coupling portion of the case 3. In this case, the opening of the first outside air introduction duct 31 can be arranged flexibly such that outside air having a relatively low temperature, such as air that has not passed through the radiator 8, can be introduced into the first outside air introduction duct 31. Also, the first outside air introduction duct 31 can be connected to the cap 4 and the second outside air introduction duct 33 can be connected to the case 3.

The hinge receiving body 63 can have a substantially tubular shape having a bottom end. Also, the wall of the tubular portion of the hinge receiving body 63 may have a curved shape (e.g., arc shape) to correspond to the shape of the projection 77 of the hinge shaft portion 22, the wall defining the hinge engagement opening 21.

Additional advantages and modifications will readily occur to those skilled in the art. The invention in its broader term is therefore not limited to the specific details, representative apparatus, and illustrative examples shown and described.

What is claimed is:

1. An air cleaner unit for an internal combustion engine of a vehicle, the air cleaner unit comprising:
    a filter element for filtering air to be introduced into the internal combustion engine, the filter element including an element body and a peripheral portion on a periphery of the element body; and
    a casing including a first case member and a second case member being coupled to each other in a front and rear direction of the vehicle, the first case member having a first opening and a first sealing surface on a periphery of the first opening, the second case member having a second opening and a second sealing surface on a periphery of the second opening, the first case member being disposed such that the first opening faces in a rearward direction of the vehicle, the filter element is disposed in an element housing portion defined by the first opening, the second case member being coupled to the first case member such that the second opening is opposed to the first opening and the peripheral portion of the filter element is disposed between the first sealing surface and the second sealing surface, wherein
    the first case member includes a hinge receiving portion at a lower end thereof,
    the second case member includes a hinge inserting portion at a lower end thereof,
    the hinge receiving portion includes an engagement opening, and the hinge inserting portion is received in the engagement opening such that the hinge receiving portion and the hinge inserting portion are connected to each other in a hinge manner,
    the engagement opening is located at a position overlapping with the element body with respect to the front and rear direction of the vehicle, and a rear end of the engagement opening is located more to front side of the vehicle than a rear end of the element body,
    the hinge receiving portion further includes a hinge receiving surface that extends from the rear end of the engagement opening in a horizontal and rearward direction of the vehicle up to a position without overlapping with the element body to receive the hinge inserting portion once before the hinge inserting portion is dropped in the engagement opening when the second case member is coupled to the first case member.

2. The air cleaner unit according to claim 1, wherein
the hinge receiving portion further includes inclined guide surfaces on opposite sides of the hinge receiving surface, the inclined guide surfaces being sloped down toward the hinge receiving surface and extending up to opposite sides of the engagement opening.

3. The air cleaner unit according to claim 1, wherein
the hinge inserting portion includes a hinge head at an end received in the engagement opening, and
a length of a portion of the hinge receiving surface projecting more to the rear side of the vehicle than the rear end of the element body is longer than a length of the hinge head with respect to the front and rear direction of the vehicle.

4. The air cleaner unit according to claim 3, wherein
the first case member has a rib that projects from the second sealing surface toward the filter element to restrict shrinkage of the filter element.

* * * * *